(12) United States Patent
Lin et al.

(10) Patent No.: US 10,684,541 B1
(45) Date of Patent: Jun. 16, 2020

(54) OPTICAL MODULE

(71) Applicant: QISDA CORPORATION, Taoyuan (TW)

(72) Inventors: Wen-Yao Lin, Taoyuan (TW); Chi-Hung Hsiao, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/362,714

(22) Filed: Mar. 25, 2019

(30) Foreign Application Priority Data

Dec. 12, 2018 (TW) .............................. 107144658 A

(51) Int. Cl.
G03B 21/20 (2006.01)
G02B 26/00 (2006.01)
(52) U.S. Cl.
CPC ......... *G03B 21/204* (2013.01); *G02B 26/008* (2013.01)
(58) Field of Classification Search
CPC ............................ F21S 10/007; H04N 9/3114
See application file for complete search history.

(56) References Cited

U.S. PATENT DOCUMENTS

| 2013/0294080 | A1* | 11/2013 | Hansen | ................... | F21S 10/00 |
| | | | | | 362/271 |
| 2016/0033854 | A1* | 2/2016 | Pettitt | .................. | G03B 21/204 |
| | | | | | 353/7 |
| 2018/0188640 | A1 | 7/2018 | Huang | | |

FOREIGN PATENT DOCUMENTS

| CN | 105759549 A | 7/2016 |
| TW | 201802567 A | 1/2018 |

\* cited by examiner

*Primary Examiner* — William J Carter
*Assistant Examiner* — Omar Rojas Cadima

(57) ABSTRACT

An optical module includes a light source, a phosphor wheel, a first driving unit, a color wheel, a second driving unit, a third driving unit and a control unit. The phosphor wheel includes a phosphor area. The color wheel includes a plurality of sector-shaped filters. At least one of the sector-shaped filters includes a plurality of filter areas. Central angles of the filter areas are identical. Colors of at least two adjacent filter areas are different. The control unit selectively controls one of the first driving unit and the second driving unit by a delay time to control an overlap ratio between the phosphor area and one of the filter areas. The control unit selectively controls the third driving unit to drive the color wheel to move with respect to the phosphor wheel, so as to move one of the filter areas to a position corresponding to the phosphor area.

5 Claims, 6 Drawing Sheets

OPTICAL MODULE

BACKGROUND OF THE INVENTION

1. Field of the Invention

The invention relates to an optical module and, more particularly, to an optical module capable of satisfying requirements of different color light output and different color gamut by controlling an overlap ratio between a phosphor area of a phosphor wheel and a filter area of a color wheel.

2. Description of the Prior Art

A color wheel is a color source of a digital light processing (DLP) projector. A light emitted by a light source is reflected by a digital micromirror device (DMD) and then passes through the color wheel, so as to render different colors. In general, the color wheel consists of a plurality of filters. When different color light output (CLO) is required, a central angle of the color filter has to be changed. Since the filters with different central angles have to be manufactured individually, the manufacture cost of the color wheel will increase.

SUMMARY OF THE INVENTION

An objective of the invention is to provide an optical module capable of satisfying requirements of different color light output and different color gamut by controlling an overlap ratio between a phosphor area of a phosphor wheel and a filter area of a color wheel, so as to solve the aforesaid problems.

According to an embodiment of the invention, an optical module comprises a light source, a phosphor wheel, a first driving unit, a color wheel, a second driving unit, a third driving unit and a control unit. The phosphor wheel is disposed corresponding to the light source and the phosphor wheel comprises a phosphor area. The first driving unit is configured to drive the phosphor wheel to rotate. The color wheel is disposed corresponding to the phosphor wheel and the color wheel comprises a plurality of sector-shaped filters. The sector-shaped filters are arranged in a circle and at least one of the sector-shaped filters comprises a plurality of filter areas. Central angles of the filter areas are identical and colors of at least two adjacent filter areas are different. The second driving unit is configured to drive the color wheel to rotate. The third driving unit is configured to drive the color wheel to move with respect to the phosphor wheel. The control unit is electrically connected to the first driving unit, the second driving unit and the third driving unit. When the control unit controls the first driving unit to drive the phosphor wheel to rotate and controls the second driving unit to drive the color wheel to rotate, the control unit selectively controls one of the first driving unit and the second driving unit by a delay time to control an overlap ratio between the phosphor area and one of the filter areas. The control unit selectively controls the third driving unit to drive the color wheel to move with respect to the phosphor wheel, so as to move one of the filter areas to a position corresponding to the phosphor area.

As mentioned in the above, the optical module of the invention controls the overlap ratio between the phosphor area of the phosphor wheel and the filter area of the color wheel by the delay time and controls the color wheel to move with respect to the phosphor wheel, so as to satisfy requirements of different color light output and different color gamut. Since the filter areas on the filter of the color wheel have identical central angles, the invention does not need to manufacture the filters with different central angles individually, such that the manufacture cost of the color wheel can be reduced effectively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
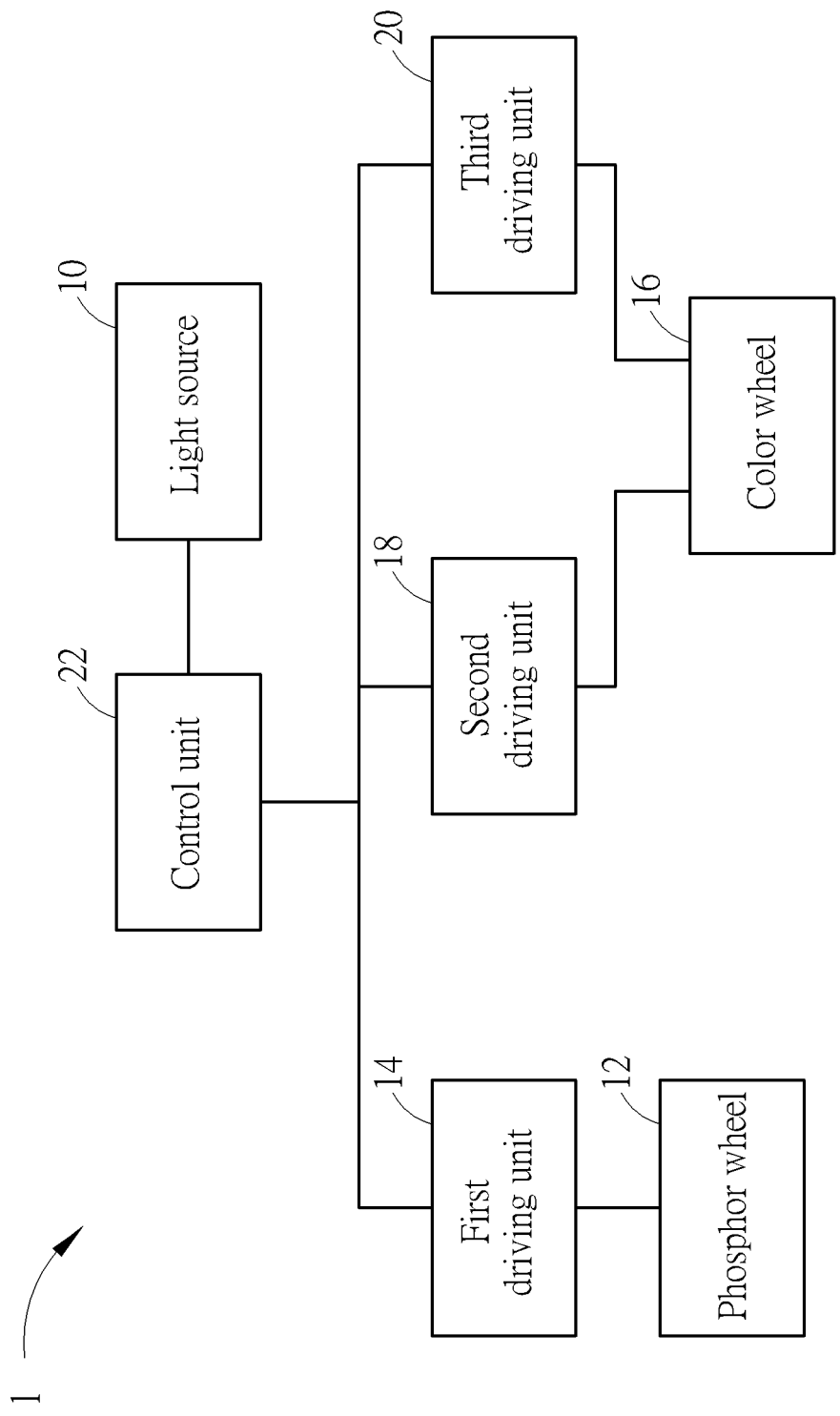
FIG. 1 is a functional block diagram illustrating an optical module according to an embodiment of the invention.
Figure 2:
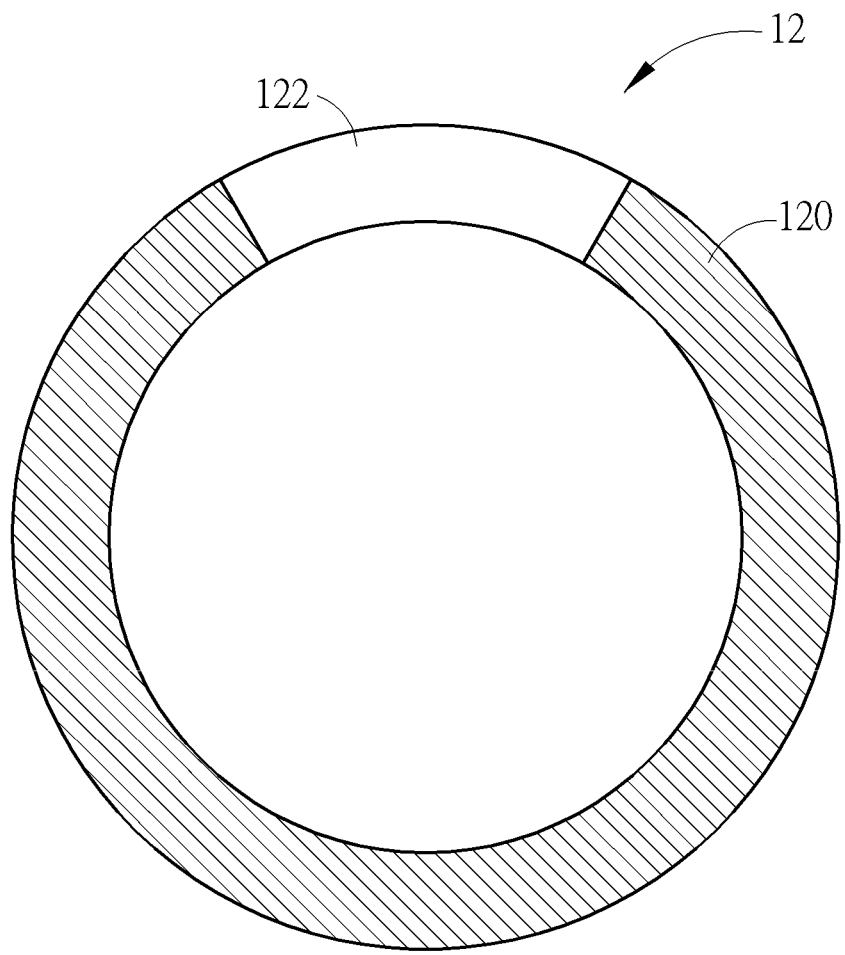
FIG. 2 is a schematic diagram illustrating the phosphor wheel shown in FIG. 1.
Figure 3:
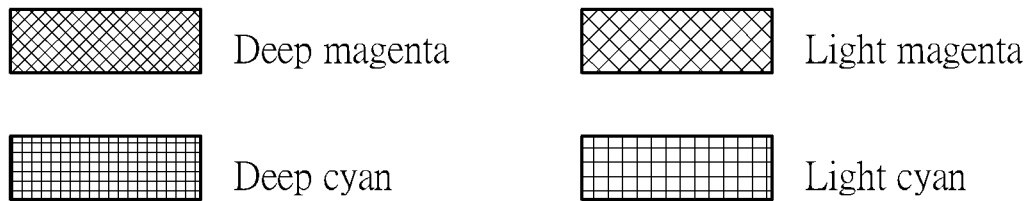
FIG. 3 is a schematic diagram illustrating the color wheel shown in FIG. 1.
Figure 3:
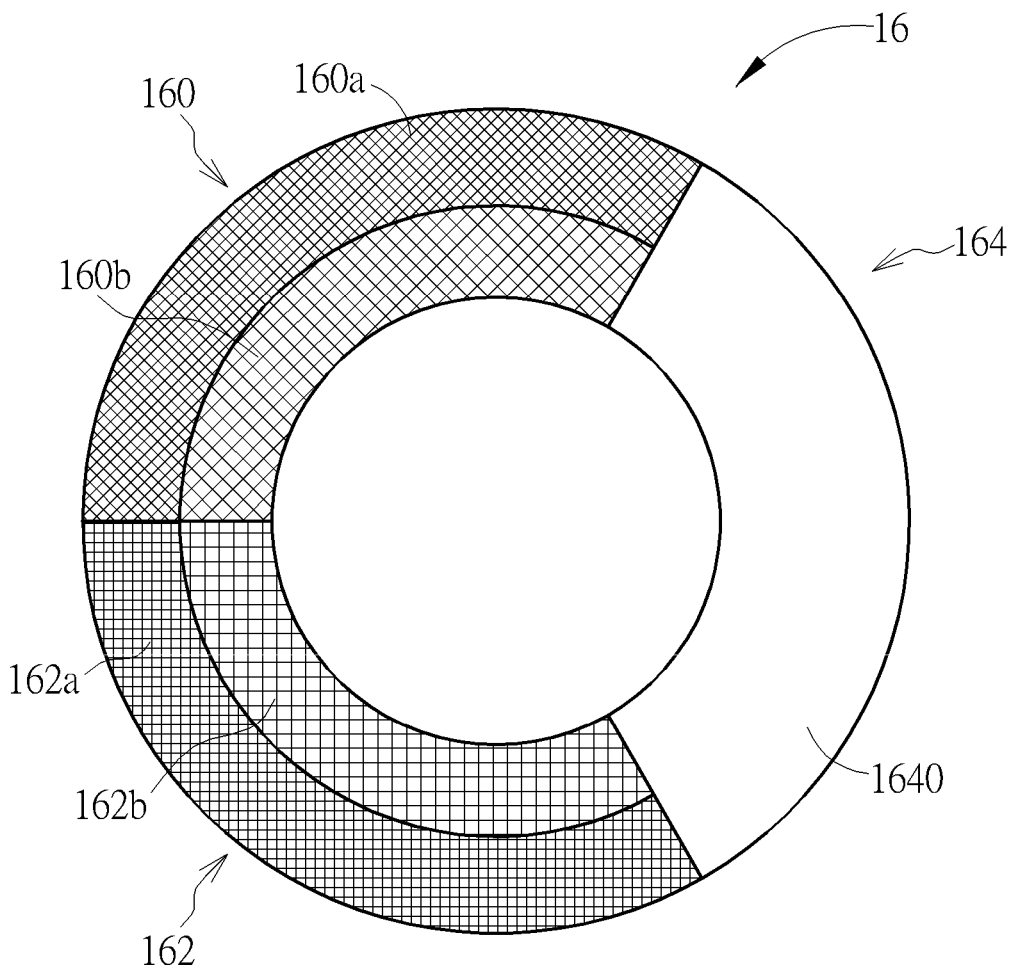
Figure 4:
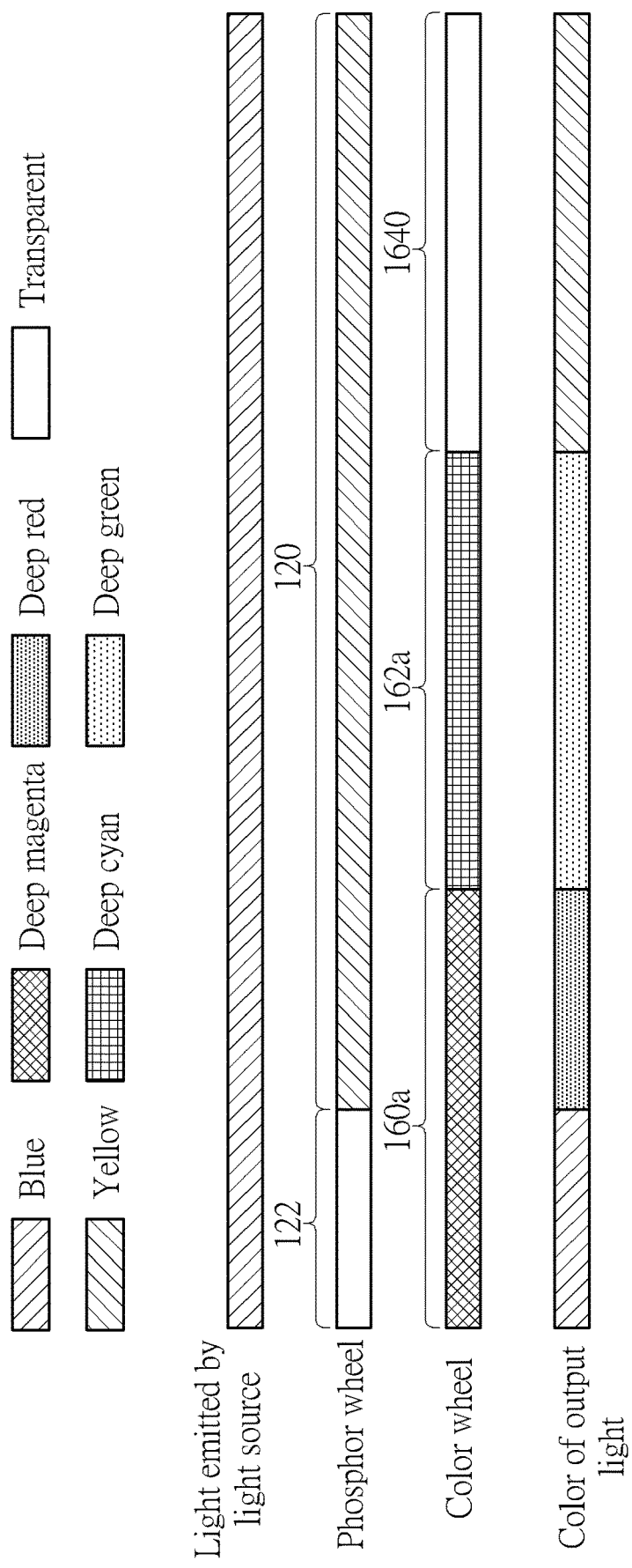
FIG. 4 is a schematic diagram illustrating the colors of output light after the light passes through the phosphor wheel and the color wheel.
Figure 5:
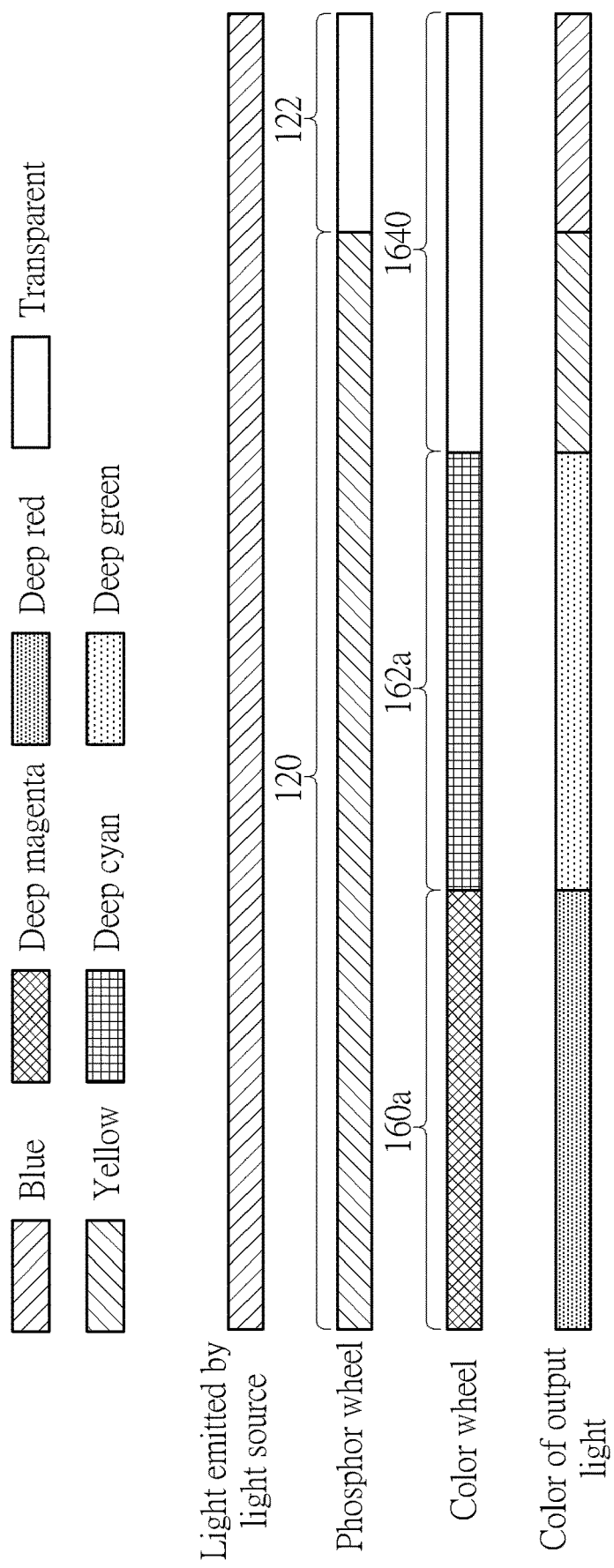
FIG. 5 is another schematic diagram illustrating the colors of output light after the light passes through the phosphor wheel and the color wheel.
Figure 6:
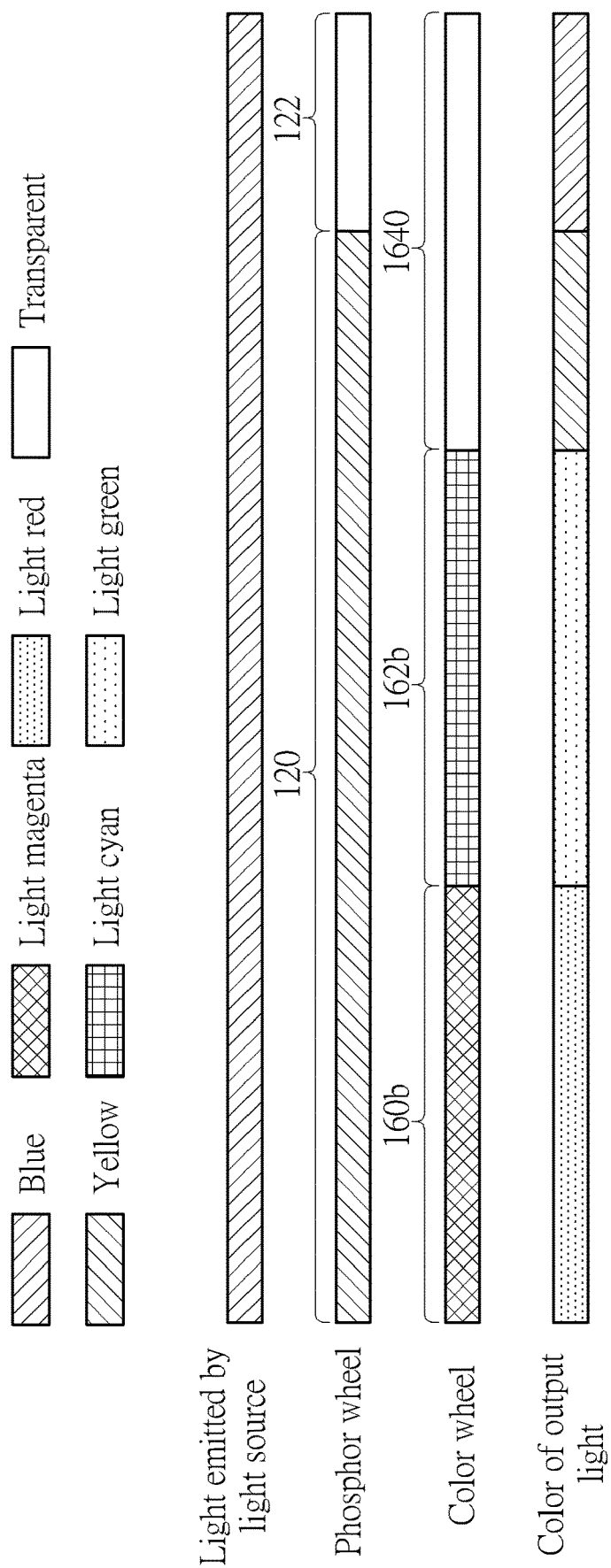
FIG. 6 is another schematic diagram illustrating the colors of output light after the light passes through the phosphor wheel and the color wheel.

Referring to FIGS. 1 to 6, FIG. 1 is a functional block diagram illustrating an optical module 1 according to an embodiment of the invention, FIG. 2 is a schematic diagram illustrating the phosphor wheel 12 shown in FIG. 1, FIG. 3 is a schematic diagram illustrating the color wheel 16 shown in FIG. 1, FIG. 4 is a schematic diagram illustrating the colors of output light after the light passes through the phosphor wheel 12 and the color wheel 16, FIG. 5 is another schematic diagram illustrating the colors of output light after the light passes through the phosphor wheel 12 and the color wheel 16, and FIG. 6 is another schematic diagram illustrating the colors of output light after the light passes through the phosphor wheel 12 and the color wheel 16.

As shown in FIG. 1, the optical module 1 comprises a light source 10, a phosphor wheel 12, a first driving unit 14, a color wheel 16, a second driving unit 18, a third driving unit 20 and a control unit 22. The optical module 1 may be applied to a projector or other optical devices to output various colors of light. In this embodiment, the light source 10 may be, but not limited to, a laser. The first driving unit 14 is configured to drive the phosphor wheel 12 to rotate. The second driving unit 18 is configured to drive the color wheel 16 to rotate and the third driving unit 20 is configured to drive the color wheel 16 to move with respect to the phosphor wheel 12. In this embodiment, the first driving unit 14, the second driving unit 18 and the third driving unit 20 may be, but not limited to, motors. The control unit 22 is electrically connected to the light source 10, the first driving unit 14, the second driving unit 18 and the third driving unit 20. In this embodiment, the control unit 22 may be a controller configured to control the light source 10, the first driving unit 14, the second driving unit 18 and the third driving unit 20.

The phosphor wheel 12 is disposed corresponding to the light source 10 and the color wheel 16 is disposed corresponding to the phosphor wheel 12. As shown in FIG. 2, the phosphor wheel 12 comprises a phosphor area 120 and a transparent area 122. In this embodiment, the phosphor area 120 is an area coated by a phosphor. For example, when the light source 10 emits a blue light, the phosphor area 120 of the phosphor wheel 12 has a yellow phosphor for converting the blue light into a yellow light and the blue light can pass through the transparent area 122 immediately. It should be noted that the color of the light emitted by the light source 10 and the color of the phosphor area 120 may be determined according to practical applications, so the invention is not limited to the aforesaid embodiment.

As shown in FIG. 3, the color wheel 16 comprises a plurality of sector-shaped filters 160, 162, 164 and the sector-shaped filters 160, 162, 164 are arranged in a circle, wherein at least one of the sector-shaped filters comprises a plurality of filter areas, central angles of the filter areas are identical, and colors of at least two adjacent filter areas are different. In this embodiment, the sector-shaped filter 160 may comprise two filter areas 160a, 160b, the central angles of the two filter areas 160a, 160b are identical, and the colors of the two filter areas 160a, 160b are different; the sector-shaped filter 162 may comprise two filter areas 162a, 162b, the central angles of the two filter areas 162a, 162b are identical, and the colors of the two filter areas 162a, 162b are different; and the sector-shaped filter 164 may comprise one transparent area 1640. It should be noted that the number of the sector-shaped filters and the number of the filter areas of each sector-shaped filter may be determined according to practical applications, so the invention is not limited to the aforesaid embodiment.

In this embodiment, the light source 10 may emit a primary color light, and the phosphor area 120 of the phosphor wheel 12 and the filter areas 160a, 160b, 162a, 162b of the sector-shaped filters 160, 162 may have secondary colors. For example, when the light source 10 emits a blue light, the phosphor area 120 of the phosphor wheel 12 may be yellow and the filter areas 160a, 160b, 162a, 162b of the sector-shaped filters 160, 162 may be magenta or cyan.

In this embodiment, the filter areas 160a, 160b of the sector-shaped filter 160 may belong to an identical color system (e.g. magenta) and the filter areas 162a, 162b of the sector-shaped filter 162 may belong to an identical color system (e.g. cyan). Since the colors of the two filter areas 160a, 160b are different, the filter area 160a may be deep magenta and the filter area 160b may be light magenta. Similarly, since the colors of the two filter areas 162a, 162b are different, the filter area 162a may be deep cyan and the filter area 162b may be light cyan.

In another embodiment, the filter areas 160a, 160b of the sector-shaped filter 160 may belong to different color systems and the filter areas 162a, 162b of the sector-shaped filter 162 may belong to different color systems. For example, the filter area 160a may be deep magenta, the filter area 160b may be light cyan, the filter area 162a may be deep cyan, and the filter area 162b may be light magenta.

It should be noted that the colors of the filter areas of each sector-shaped filter may be determined according to practical applications, so the invention is not limited to the aforesaid embodiment.

When the optical module is operating, the control unit 22 controls the first driving unit 14 to drive the phosphor wheel 12 to rotate and controls the second driving unit 18 to drive the color wheel 16 to rotate. When the transparent area 122 of the phosphor wheel 12 corresponds to a part of the filter area 160a of the color wheel 16 and the phosphor area 120 of the phosphor wheel 12 corresponds to another part of the filter area 160a, the filter area 162 and the transparent area 1640 of the color wheel 16, the colors of output light are shown in FIG. 4 after the light emitted by the light source 10 passes through the phosphor wheel 12 and the color wheel 16. In this embodiment, the light source 10 emits a blue light, the phosphor area 120 is yellow, the filter area 160a is deep magenta, and the filter area 162a is deep cyan. Consequently, the colors of output light are blue, deep red, deep green and yellow.

When different color light output is required, the control unit 22 may selectively control one of the first driving unit 14 and the second driving unit 18 by a delay time to control an overlap ratio between the phosphor area 120 of the phosphor wheel 12 and one of the filter areas 160a, 162a of the color wheel 16, so as to adjust the ratio of the colors of output light. As shown in FIG. 5, after the control unit 22 controls one of the first driving unit 14 and the second driving unit 18 by the delay time, the overlap ratio between the phosphor area 120 of the phosphor wheel 12 and the filter area 160a of the color wheel 16 increases, such that the ratio of the output red light will increase. Accordingly, the invention can adjust the ratio of the colors of output light according to the requirement of different color light output.

When different color gamut is required, the control unit 22 may selectively control the third driving unit 20 to drive the color wheel 16 to move with respect to the phosphor wheel 12, so as to move one of the filter areas 160a, 160b, 162a, 162b to a position corresponding to the phosphor area 120. As shown in FIG. 6, the control unit 22 may control the third driving unit 20 to drive the color wheel 16 to move with respect to the phosphor wheel 12, so as to move the filter areas 160b, 162b to a position corresponding to the phosphor area 120. In this embodiment, the light source 10 emits a blue light, the phosphor area 120 is yellow, the filter area 160b is light magenta, and the filter area 162b is light cyan. Consequently, the colors of output light are light red, light green, yellow and blue. Accordingly, the invention can adjust the colors of output light according to the requirement of different color gamut.

As mentioned in the above, the optical module of the invention controls the overlap ratio between the phosphor area of the phosphor wheel and the filter area of the color wheel by the delay time and controls the color wheel to move with respect to the phosphor wheel, so as to satisfy requirements of different color light output and different color gamut. Since the filter areas on the filter of the color wheel have identical central angles, the invention does not need to manufacture the filters with different central angles individually, such that the manufacture cost of the color wheel can be reduced effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical module comprising:
   a light source;
   a phosphor wheel disposed corresponding to the light source, the phosphor wheel comprising a phosphor area;
   a first driving unit configured to drive the phosphor wheel to rotate;
   a color wheel disposed corresponding to the phosphor wheel, the color wheel comprising a plurality of sector-shaped filters, the sector-shaped filters being arranged in a circle, at least one of the sector-shaped filters comprising a plurality of filter areas, central angles of the filter areas being identical, colors of at least two adjacent filter areas being different;

a second driving unit configured to drive the color wheel to rotate;

a third driving unit configured to drive the color wheel to move with respect to the phosphor wheel; and a control unit electrically connected to the first driving unit, the second driving unit and the third driving unit;

wherein when the control unit controls the first driving unit to drive the phosphor wheel to rotate and controls the second driving unit to drive the color wheel to rotate, the control unit selectively controls one of the first driving unit and the second driving unit by a delay time to control an overlap ratio between the phosphor area and one of the filter areas; the control unit selectively controls the third driving unit to drive the color wheel to move with respect to the phosphor wheel, so as to move one of the filter areas to a position corresponding to the phosphor area.

2. The optical module of claim 1, wherein the light source emits a blue light and the phosphor area has a yellow phosphor for converting the blue light into a yellow light.

3. The optical module of claim 1, wherein the light source emits a primary color light, and the phosphor area and the filter areas have secondary colors.

4. The optical module of claim 1, wherein the filter areas belong to an identical color system.

5. The optical module of claim 1, wherein the filter areas belong to different color systems.

* * * * *